US008117434B2

(12) United States Patent
Sun et al.

(10) Patent No.: US 8,117,434 B2
(45) Date of Patent: Feb. 14, 2012

(54) COMPONENT CONFIGURATION MECHANISM FOR REBOOTING

(75) Inventors: Enxi Sun, Waltham, MA (US); David Doggett, Arlington, MA (US)

(73) Assignee: Schneider Electric USA, Inc., Palatine, IL (US)

( * ) Notice: Subject to any disclaimer, the term of this patent is extended or adjusted under 35 U.S.C. 154(b) by 502 days.

(21) Appl. No.: 12/347,300

(22) Filed: Dec. 31, 2008

(65) Prior Publication Data

US 2010/0169632 A1 Jul. 1, 2010

(51) Int. Cl.
G06F 9/00 (2006.01)
G06F 15/177 (2006.01)
G06F 13/00 (2006.01)
G06F 11/00 (2006.01)
G06F 9/44 (2006.01)
G06F 9/445 (2006.01)

(52) U.S. Cl. ................ 713/2; 713/1; 713/100; 709/220; 710/104; 714/2; 714/48; 714/746; 717/171; 717/176

(58) Field of Classification Search .................. 713/1, 2, 713/100; 709/220; 710/104; 714/2, 48, 714/746; 717/171, 176
See application file for complete search history.

(56) References Cited

U.S. PATENT DOCUMENTS

| 6,272,626 | B1 | 8/2001 | Cobbett |
| 6,397,327 | B1 | 5/2002 | Klebanov |
| 6,584,559 | B1* | 6/2003 | Huh et al. ......................... 713/2 |
| 7,181,604 | B2 | 2/2007 | King et al. |
| 7,313,684 | B2 | 12/2007 | O'Connell |
| 7,318,129 | B1 | 1/2008 | Falik et al. |
| 7,318,148 | B2 | 1/2008 | Scheibli |
| 7,373,551 | B2 | 5/2008 | Rothman et al. |
| 7,386,711 | B1* | 6/2008 | Haimovsky et al. .............. 713/2 |
| 7,411,417 | B1 | 8/2008 | Rutledge et al. |
| 7,607,005 | B1* | 10/2009 | Lewis ........................... 713/100 |
| 2002/0147941 | A1* | 10/2002 | Gentile ........................... 714/36 |
| 2004/0034765 | A1 | 2/2004 | James |
| 2004/0268106 | A1 | 12/2004 | Holmberg et al. |
| 2005/0044348 | A1 | 2/2005 | O'Connell |
| 2006/0020845 | A1* | 1/2006 | Broyles et al. ..................... 714/2 |
| 2006/0143431 | A1 | 6/2006 | Rothman et al. |
| 2006/0288202 | A1* | 12/2006 | Doran et al. ....................... 713/2 |
| 2007/0133567 | A1 | 6/2007 | West et al. |
| 2007/0168704 | A1 | 7/2007 | Connolly et al. |

FOREIGN PATENT DOCUMENTS

WO 9913388 A1 3/1999

OTHER PUBLICATIONS

International Search Report for related Application No. PCT/US2009/069778, mailed Jun. 24, 2010, pp. 1-6.

* cited by examiner

Primary Examiner — Stefan Stoynov (57) ABSTRACT

Aspects of the invention support a component configuration mechanism when rebooting a circuit module (201) of a programmable logic controller (101). A component (application) may be configured from a plurality of sources, including flash memory (204) and a web-based configuration source. The configuration mechanism avoids using invalid configuration data when replacing the communication module. The circuit module may support a plurality of components, where some of the components may be associated with a web-based configuration while other components may be associated with a CPU-based configuration. If the configuration data in the flash memory of the communication module is determined to be invalid, the communication module obtains configuration data from a web-based configuration source for a web-based configured component and from an associated CPU module (202) for a CPU-based configured component. The validity of configuration data in internal memory is determined by comparing values of cyclic checksums and configuration times. 12347300

19 Claims, 8 Drawing Sheets

| Scenarios | | CPU | | Communication Module | |
|---|---|---|---|---|---|
| 1 | Same | ON | | Same | reboot |
| 2 | Same | ON | New config* | Same | ON |
| 3 | Same | reboot | | Same | reboot |
| 4 | Same | ON | | New placement | reboot |
| 5 | New placement | reboot | New config* | New placement | reboot |
| 6 | New placement | reboot | New config* | Same | reboot |
| 7 | | | | New placement | reboot |

COMPONENT CONFIGURATION MECHANISM FOR REBOOTING

BACKGROUND

Factory automation systems are increasingly being integrated with communication networks. Control systems are being implemented on networks for remote monitoring and control of devices, processes, etc. System failures involving the primary mode controller that can shut down the control system are avoided by having a back-up controller readily available in hot/active standby mode to replace the failing primary mode controller. Even with system redundancy, it is important that any system failures be repaired expeditiously in order to reduce the probability of a system outage.

Controllers such as programmable logic controllers (PLC) have been implemented in duplex or back-up system configurations where downtime of a system cannot be tolerated. Such a control system delivers high reliability through redundancy. Generally, the duplex configuration incorporates a pair of PLC's assembled in a hot or active standby configuration, where one PLC is operating in a primary mode and the other PLC is functioning in a secondary or standby/backup mode. The primary controller runs an application by scanning a user program to control and monitor a remote input/output (I/O) network. The other (secondary) controller acts as the active standby controller. The standby controller does not run the application and does not operate the remote I/O devices. The standby controller is updated by the primary controller with each scan. The standby controller is then ready to assume control of the control system within one scan if the primary controller fails to operate or is removed from operation.

The primary and secondary controllers are interchangeable and can be swapped or switched when desired. Either controller can be placed in the primary state. The active standby configuration requires the non-primary controller to be placed in the standby mode to secure the system's redundancy. The controllers continuously communicate with each other to ensure the operability of the control system. The communication among the controllers is used to determine if a swap of the controllers should be initiated due to a system failure or by election of an operator.

Even with a primary/secondary controller configuration where the inoperative controller can be removed from service, it is important that an inoperative controller be repaired in order to provide a reliability that is often expected by the operator. A controller typically includes a number of circuit packs, e.g., a central processor unit (CPU) module and communication module that interfaces with external devices. In order to repair an inoperative controller, a detected faulty module is typically replaced with an operative module. However, a controller functions in a specific control environment; consequently, an inserted circuit pack is typically configured for the control environment.

SUMMARY

An aspect of the invention provides apparatuses, computer-readable media, and methods for supporting a component configuration mechanism when rebooting a communication module of a programmable logic controller. The component (application) in the communication module may be configured from a plurality of sources, including PLC (Unity Pro), flash memory and a web-based configuration source. The configuration mechanism avoids using invalid configuration data when replacing the communication module.

With another aspect of the invention, a circuit module of a programmable logic controller (PLC) includes an internal memory configured to store stored configuration information, a communication interface configured to obtain external configuration information from an external configuration source, and a processor configured to determine a configuration scenario and to select a configuration source based on the configuration scenario. The configuration source may be either the internal memory (e.g., flash memory) or the external configuration source. The circuit module may assume different types of modules including a communication module that interfaces to an Ethernet network.

With another aspect of the invention, a communication module may support a plurality of components. Some of the components may be associated with a web-based configuration while other components may be associated with a CPU-based configuration. If the configuration data in the flash memory of the communication module is determined to be invalid, the communication module obtains configuration data from a web-based configuration source for a web-based configured component and from an associated CPU module for a CPU-based configured component.

With another aspect of the invention, a communication module determines the validity of configuration data in its internal memory by comparing values of cyclic checksums and configuration times.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Some firmware components in the communication module are configured by an engineering tool, e.g., Unity Pro, through a programmable logic controller (PLC), which stores the configuration data from the engineering tool. Other firmware components in the communication module may be configured by "WEB" through the Ethernet, e.g., Web page and FTP client. All the configuration data, whether from the PLC or from "WEB", are stored in the local flash of the communication module.

In the case of the communication module being reset, it is typically expected to read the configuration data from the local flash instead of reading from the PLC and/or from the "WEB" for improving the system start-up performance.

In the case of the communication module being replaced by a used module with correct configuration data for another control system, but not for the current control system, the communication module should not configure its components with the configuration data in its local flash.

A mechanism is needed to make sure the communication module configured correctly on both the cases above.

Figure 1:
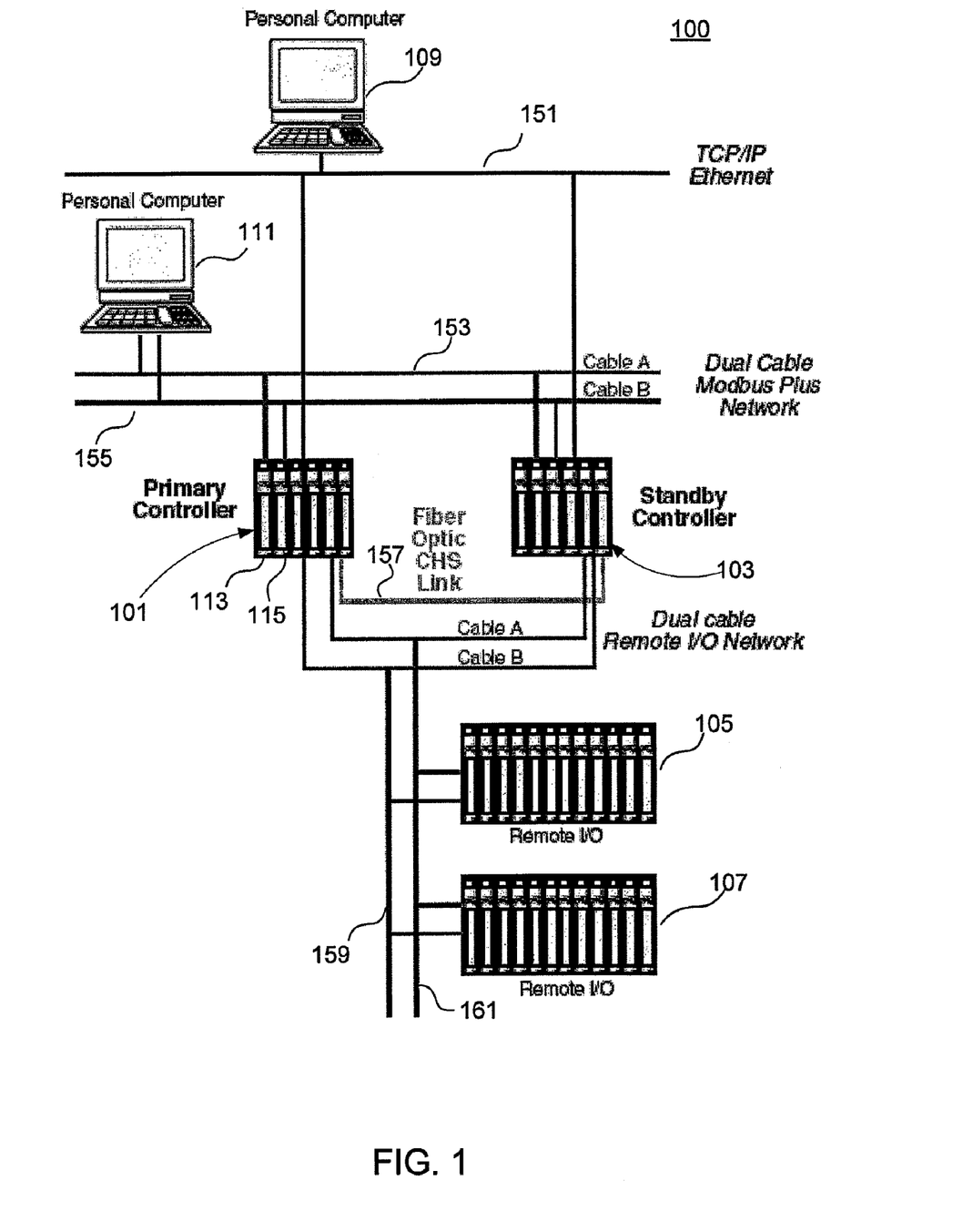
FIG. 1 shows a control system according to an embodiment of the invention.

FIG. 1 shows a control system according to an embodiment of the invention. Two identically configured programmable logic controllers (PLC's) 101 and 103 communicate with each other via the standby option processor located in each programmable logic controller over fiber optic link 157. Fiber optic link 157 may support one of different protocols, including Ethernet and High-Level Data Link Control (HDLC) at layer 2 of the OSI model. One of the programmable logic controllers typically acts as the primary controller, while the other programmable logic controller is in standby mode (corresponding to the secondary controller). The standby controller is able to take ownership of remote I/O links 159 and 161, which communicate with remote I/O devices 105 and 107.

PLC's 101 and 103 typically include a number of circuit modules (circuit packs) (e.g., circuit modules 113 and 115) that are inserted in a backplane housing. If PLC 101 and 103 becomes inoperative, a user may exchange the determined faulty circuit module with a good circuit module, which may be a new or an old spare. If the circuit module is an old spare, it typically has been previously configured for a different PLC that may be associated with a different control environment. As an example, a user may determine that a communication module is bad and replaces it with another communication from a PLC that is offline.

A user communicates and controls programmable logic controllers 101 and 103 from computers 109 and 111 over links 151, 153, and 155. With an embodiment, links 151, 153, and 155 operate in accordance with Transmission Control Protocol/Internet Protocol (TCP/IP) over an Ethernet network.

Figure 2:
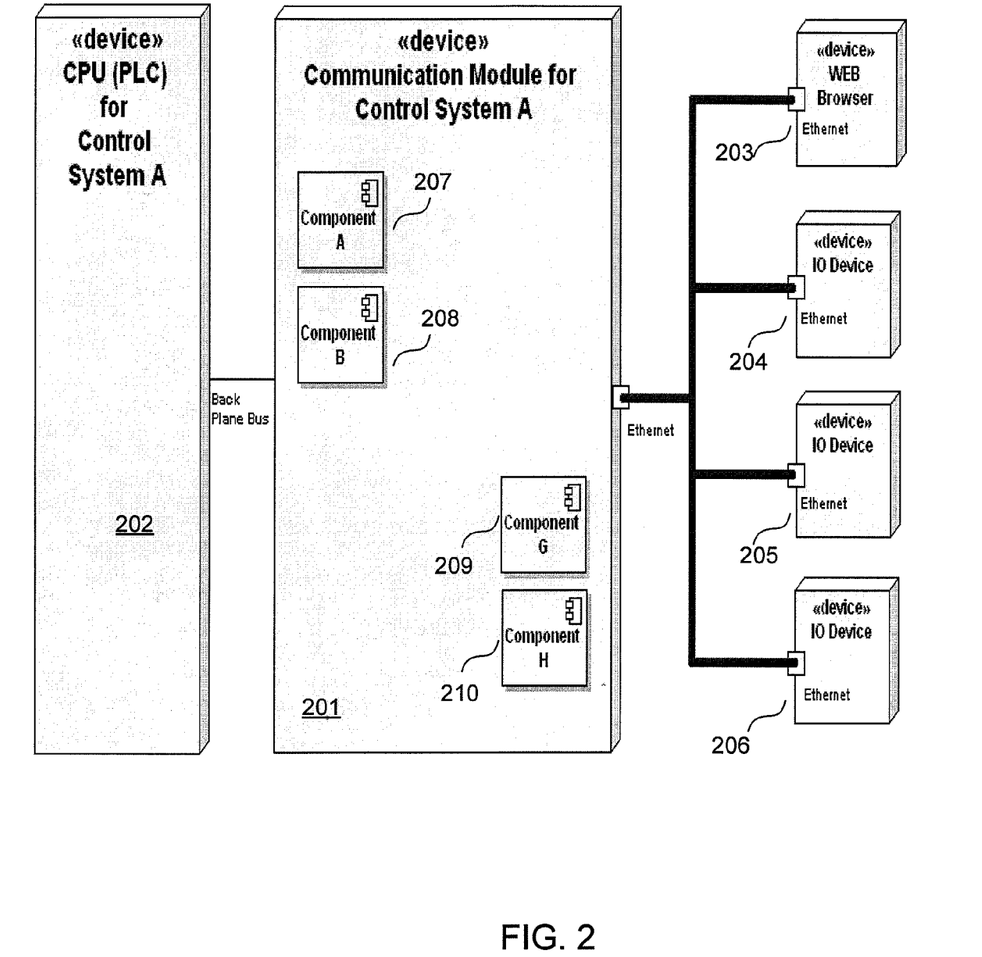
FIG. 2 shows a block diagram of a network control system according to an embodiment of the invention.

FIG. 2 shows a block diagram of a network control system according to an embodiment of the invention. For example, a network control system consists of a programming logic controller (PLC or CPU module 202), communication module 201, web browser 203, I/O devices 204-206, and engineering tools (not shown) for configuration and diagnosing. Communication module 201 may contain numerous firmware components (applications, e.g., components 207-210), where some components are configured from a web-based configuration source ("WEB") (e.g., components 207 and 208) and some components are configured from CPU module 202 (e.g., components 209 and 210) typically in conjunction with a configuration tool. When communication module 201 is deemed broken, the user may replace it with another communication module which may contain configuration data from WEB but for a different control system. This may result in a problem of configuring the system with configuration data for other system. Examples of components that are web-based configured include IO Scanner, Global Data component, and switch component. Examples of components that are CPU-based configured include DHCP server and SNMP Agent component. With some embodiments, when communication module 201 determines that configuration data must be obtained from WEB, communication module 201 waits for the configuration data passively and the user inputs the configuration data. The data is sent to communication module 201 through the web browser or FTP client. With other embodiments, module 201 issues a request to a remote server device to download the configuration, in which case, the web-based configuration source is a repository of current data for web-based components and is typically located on a secure server on the Internet or a company intranet.

Figure 3:
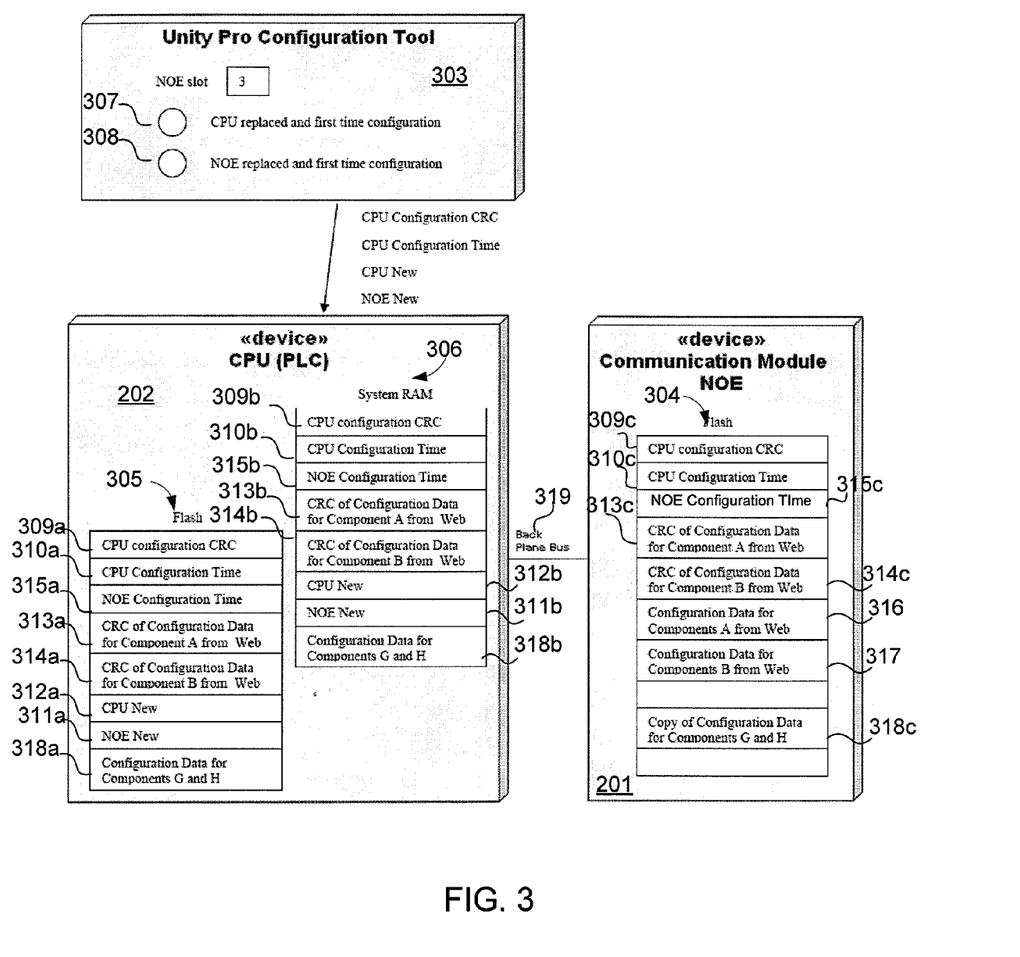
FIG. 3 shows a communication module and CPU module of a programmable logic controller according to an embodiment of the invention.

FIG. 3 shows communication module 201 and CPU module 202 of a programmable logic controller according to an embodiment of the invention. CPU module 202 may support different types of communication modules, including Network Options Ethernet (NOE) modules that interface PLC to remote I/O devices 105 and 107 over cables 159 and 161. Communication module 201 typically supports a plurality of different components (applications).

If communication module 201 needs to reconfigure (e.g., during a reboot), module 201 uses configuration data from flash memory 304 if module 201 determines that the data is correct for the operating environment. (Flash memory is non-volatile computer memory that can be electrically erased and reprogrammed.)

There are several considerations when reconfiguring (re-booting) communication module 201. For example, components including I/O scanner configuration, global data, Simple Network Management Protocol (SNMP), and Dynamic Host Configuration Protocol (DHCP) may be configured or updated. With traditional systems, if a component is configured with configuration data in flash memory, it is possible for the component to be configured with invalid data, resulting in the system crash. This may occur when the module reboots from a power-on after a power-off during writing/updating the configuration data from a CPU module or from a web-based configuration source (not shown) into flash memory. Also, with traditional systems, if a component is configured with the configuration data in flash memory, it is also possible for the component to be configured with the configuration data that is associated with a different module or different system, resulting in the system crash.

Erroneous operation may occur when a communication module fails and is replaced with another module which has the configuration data in flash memory for a different module or system. For example, an NOE module may be configured with a device scanning table for scanning different I/O devices. If a NOE module is taken from a different slot, the module may be configured for a different rack and thus will not have the correct I/O scanning table stored in the module's flash memory. When booting up, the NOE module consequently will use the existing 10 scanning table for different rack to configure and start the 10 scanner, resulting in system 100 crashing. In order to avoid this situation in traditional systems, the user can reconfigure the I/O scanner through "WEB" every time the NOE module is reset or the CPU module is reset. However, this action requires time and effort by the user.

Also, with traditional systems, if only the CPU module is replaced, the communication module may not configure itself or some components with the configuration data in flash memory and instead indicates that it is waiting for the configuration data from the web source. This situation occurs because the module's start-up firmware typically cannot make a distinction among the combinations of a new CPU module+an old communication module, an old CPU module+a new communication module, and a new CPU module+a new communication module with traditional system.

Embodiments of the invention support a component configuration mechanism during the communication module 201 booting in the condition of mixing the component configurations from WEB and PC tools and using flash configuration data backup. The configuration mechanism typically avoids using invalid configuration data from flash memory 304 due to powering off during updating the flash and replacing the communication module. The mechanism is to be used for different communication module products, for example, NOE (Network Option Ethernet), ETY, NOC (Network Option CIP), and ETC. Moreover, in addition to communication modules, embodiments of the invention support other types of circuit modules in control system 100, e.g., any modules containing configuration data and/or device parameters for other devices.

System 100 typically includes CPU (controller) module 202, communication module 201, and numerous other devices. The configuration of CPU module 202 may be through a configuration tool 303 (Unity™ Pro that executes in a PC, e.g., computers 109 or 111). Once finishing configuring CPU module 202, the user usually disconnects the configuration tool 303 (Unity Pro) with CPU module 202. As supported by communication module 201, some components are configured by CPU module 202, while other components are configured by a web-based configuration source.

With an aspect of the invention, a component configuration mechanism typically avoids the configuration of a component being configured with invalid configuration data when communication module 201 reboots (power-on) just after a power-off occurs during writing the configuration data into flash memory. The capability may be selectable. If a user wishes higher system performance, the user can chose not to use this feature. The component configuration mechanism typically avoids the configuration of any component being configured with the inappropriate existing configuration data which are associated with a different module or different system when a new module is boot up. Start-up firmware can determine whether the reboot is from a reset of the existing communication module or from a first power-on of a new replaced communication module.

Figure 5:
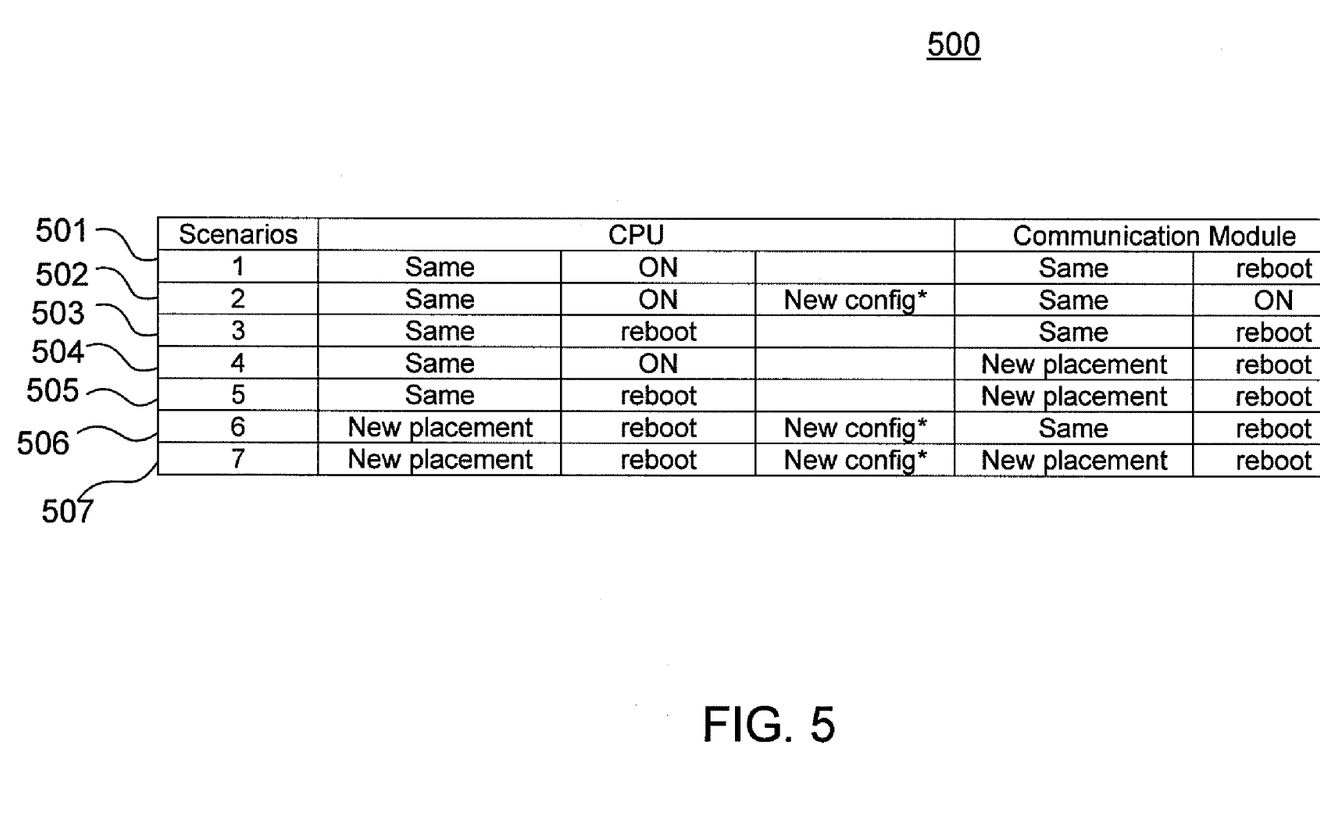
FIG. 5 shows a table with different configuration scenarios according to an embodiment of the invention.

In order to reduce the booting time and realize real automation, communication module 201 uses the local copies of the configuration data 316, 317, and 318c stored in flash memory 304 to configure its components. Therefore, the configurations of the communication module's components during rebooting considers not only the booting scenarios (cases) (as shown in FIG. 5) but also the validity of the configuration data in the local flash memory 304. With some embodiments, the booting scenario and the validity of the local copies of the configuration data are determined, where configuration information is only in CPU module 202 and communication module 201. Either or both modules can be replaced, which results in the loss of the backup configuration information. Embodiments of the invention resolve configuration ambiguities under different booting conditions (configuration scenarios).

With embodiments of the invention, Unity Pro configuration tool 303 provides checkboxes labeled as "CPU replaced and first time configuration" 307 and "NOE replaced and first time configuration" 308. When the user replaces a failed CPU module with another CPU module and configures the CPU module for the first time, the user checks "CPU replaced and first time configuration" checkbox 307. When the user replaces a failed NOE module with another NOE module and configures the NOE module for the first time, the user checks "NOE replaced and first time configuration" checkbox 308. For each replacement module, the corresponding checkbox is checked only when the first time configuration is made. Each time the user builds the configuration data, Unity Pro configuration tool 303 issues a pop up window to remind the user to set checkboxes 307 and 308 correctly.

Unity Pro configuration tool 303 downloads the configuration data to CPU module 202. Consequently, CPU module 202 obtains CPU_Config_CRC 309a, 309b, CPU_Config_Time 310a, 310b, and checkbox values CPU_new 312a, 312b and NOE_new 311a, 311b. The configuration data are stored in CPU flash memory 305 and in system RAM 306 for subsequent access by CPU module 202. The configuration values should be consistent in flash memory 305 and in RAM 306. Consequently, each time CPU module 202 reboots, these values are updated in RAM 306 from flash memory 305; each time CPU module 202 receives new configuration data from Unity Pro configuration tool 303, these configuration values are written into flash memory 305.

The cyclic redundancy code (CRC) for the configuration data 316 and 317 of each web-configured component is computed whenever configuration data 316 and 317 are configured/updated from the "WEB". (The exemplary embodiment shown in FIGS. 2 and 3 depict component A and component B.) The corresponding CRC values and module configuration time are saved both in flash memory 304 (313c, 314c, and 315c of communication module 201), flash memory 305, and system configuration table 306. The module configuration time (NOE_Config_Time 315a, 315b, 315c) is updated whenever a configuration occurs no matter whether it comes from CPU module 202 or from the WEB and should always be larger than the CPU_Config_Time (310a, 310b, 310c) from the Unity Pro configuration tool 303.

Upon configuration, communication module 201 reads CPU_Config_CRC 309b, CPU_Config_Time 310b, CPU_new 312b, and NOE_new 311b from system RAM 306 of CPU module 202. Module 201 saves them in local flash memory 304 and reads each component CRC (313c, 314c) to CPU module 202 (corresponding to Component A CRC 313b and Component B CRC 314b). CPU module 202 sets CPU_new 312b, 312a and NOE_new 311a, 311b to "0" after communication module (NOE) 201 reads them in order to indicate that both CPU module 202 and NOE module 201 are not new. With some embodiments, if CPU module cannot set CPU_new 312b and NOE_new 311b, then communication module 201 sets these values.

CPU module 202 and NOE module 201 are connected to and communicate with each other through back plane bus 319. Configuration tool 303 runs in a PC and connects to the PLC through Modbus plus port or USB port in the PLC board directly or through the Ethernet port on NOE module 201 board indirectly. In the first two cases, configuration tool 303 directly configures the PLC no matter whether NOE module 201 runs or not. In the second case, configuration tool 303 configures the PLC through NOE module board 201, which should have valid configuration and be running. The last case is mostly used for changing configuration when system 100 is already running. When configuring a PLC (new or used one in another system) into system 100 at the first time, the user should reconfigure the PLC first and system 100 should reboot.

The configuration of NOE module 201 depends on CPU module 202, which should be running and have valid configuration data for NOE module 201. NOE module 201 reads configuration information from CPU module 202 so that NOE module 201 knows which components are configured from CPU module 202 and which components are configured from WEB (not shown).

Unity Pro configuration tool 303 supports checkboxes 307 and 308 labeled "CPU replaced and first time configuration" and "NOE replaced and first time configuration," respectively. When the user replaces a failed CPU module with another CPU module and configures the CPU module for the first time, the user checks the "CPU replaced and first time configuration" checkbox 307. When the user replaces a failed NOE module with another NOE module and configures the NOE module for the first time, the user checks the "NOE replaced and first time configuration" checkbox 308. For each replacement module, the corresponding checkbox is only needed to be checked once when the first time configuration is made. Each time when the user builds the configuration data, Unity Pro configuration tool 303 issues a pop up window to remind the user to set checkboxes 307 and 308 correctly.

CPU_Config_CRC (309a, 309b) is the CRC of the CPU configuration data and the CPU_Config_Time (310a, 310b) is the CPU configuration data build time. When Unity Pro configuration tool 303 downloads the configuration data to CPU module 202, it also loads these two variables into CPU module 202 during the configuration. Also, Unity Pro configuration tool 303 loads checkbox values CPU_new 311a, 311b and NOE_new 312a, 312b to CPU module. These four values are stored in CPU flash memory 305 and in the module's configuration area in system RAM 306 for CPU module 202 to access. These values should be consistent in flash memory 305 and system RAM 306 each time the CPU reboots or with a new configuration from Unity Pro configuration tool 303. These four configuration values in system RAM 306 are typically updated from flash memory 305.

Communication module 201 stores configuration data A 316 (corresponding to web-configured component A), configuration data B 317 (corresponding to web-configured component B), and Copy_CPU_Config_Data 318c (corresponding to a CPU-configured components 209 and 210 as shown in FIG. 2). Copy_CPU_Config_Data 318c is a local copy of the configuration data from CPU (corresponding to configuration data 318a, 318b). These configuration data are originally stored in CPU module 202 and read by NOE module 201, which saves a copy of the configuration data. With a subsequent reboot, NOE module 201 uses the local copy to configure components that are CPU-configured if the local copy is valid and not corrupted.

Figure 4:
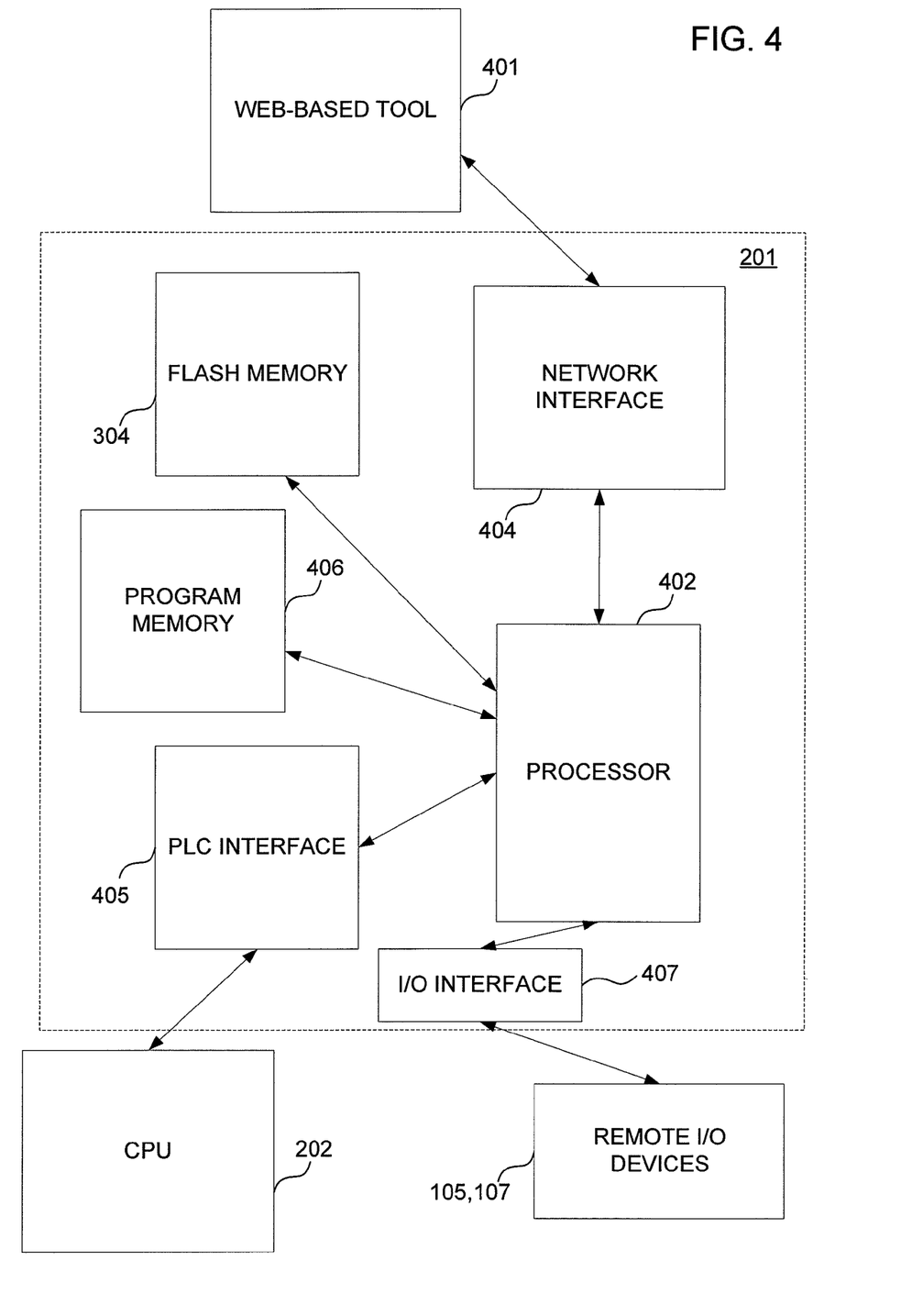
FIG. 4 shows a block diagram of a communication module according to an embodiment of the invention.

FIG. 4 shows a block diagram of communication module 201 according to an embodiment of the invention. Processor 402 may execute computer executable instructions from a computer-readable medium, e.g., memory 406. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 402.

Communication module 201 typically performs a plurality of functions corresponding to components. For example, communication module 201 scans and controls remote devices 105 and 107 through I/O interface 407 and consequently maintains a table in flash memory 304 (e.g., configuration data B 317 as shown in FIG. 3.)

Processor 402 obtains configuration data from flash memory 304 (also shown in FIG. 3) for supported components when processor 402 determines that the configuration data in flash memory 304 is valid. However, processor 402 obtains configuration data from web-based tool 401 for web-configurable components through network interface 404 and obtains configuration data from CPU module 202 for CPU-configurable components through PLC interface 405.

FIG. 5 shows table 500 with different configuration scenarios according to an embodiment of the invention. With booting scenario 501 (case 1), control system 100 (CPU, communication module, and devices) is running and no new configuration data comes from Unity Pro configuration tool 303. The same communication module is rebooted with the conditions of automatic rebooting recovery from software or hardware errors, manual rebooting performed by users, automatic rebooting forced by remote commands, and manual rebooting performed by developers and testers for developing, testing, debugging, verification, and validation.

With booting scenario 502 (case 2), control system 100 is running and the user changes the configuration of the system through Unity Pro configuration tool 303. There is no reboot from the CPU, communication module, and devices.

With booting scenario 503 (case 3), control system 100 is stopped and then the user powers on the whole system. There is no new configuration.

With booting scenario 504 (case 4), control system 100 is running and no new configuration data comes from Unity Pro configuration tool 303. Subsequently, the communication module fails, and the user replaces it with another communication module, which automatically reboots. The replacing communication module may be completely new or a used one. If it is a used module, it may contain web-configured configuration data of some web-configured components for another control system other than this one. With an aspect of the invention, previous configuration data (not for this system) is not used to configure associated components of the communication module.

With booting scenario 505 (case 5), control system 100 is stopped. The user replaces the communication module with another one and then reboots the whole system. In this condition, the communication module may contain web-configured configuration data of associated web configuring components for another control system other than this one. The communication module should not be configured with previous configuration data but instead should wait for the configuration data from the WEB.

With booting scenario 506 (case 6), control system 100 is stopped. The user replaces the CPU module with a new one and then reboots and configures system 100. In this condition, the same communication module still contains valid web configuration data in its flash and should be configured with the valid configuration data but not wait for the configuration from the WEB.

With booting scenario 507 (case 7), control system 100 is stopped. The user replaces both the CPU module and the communication module with new ones and then reboots and configures the whole system. In this condition, the communication module may contain web-configured configuration data of associated web-configured components for another control system other than this one. The communication module should not be configured previous configuration data but instead wait for the configuration from the WEB.

Figure 6:
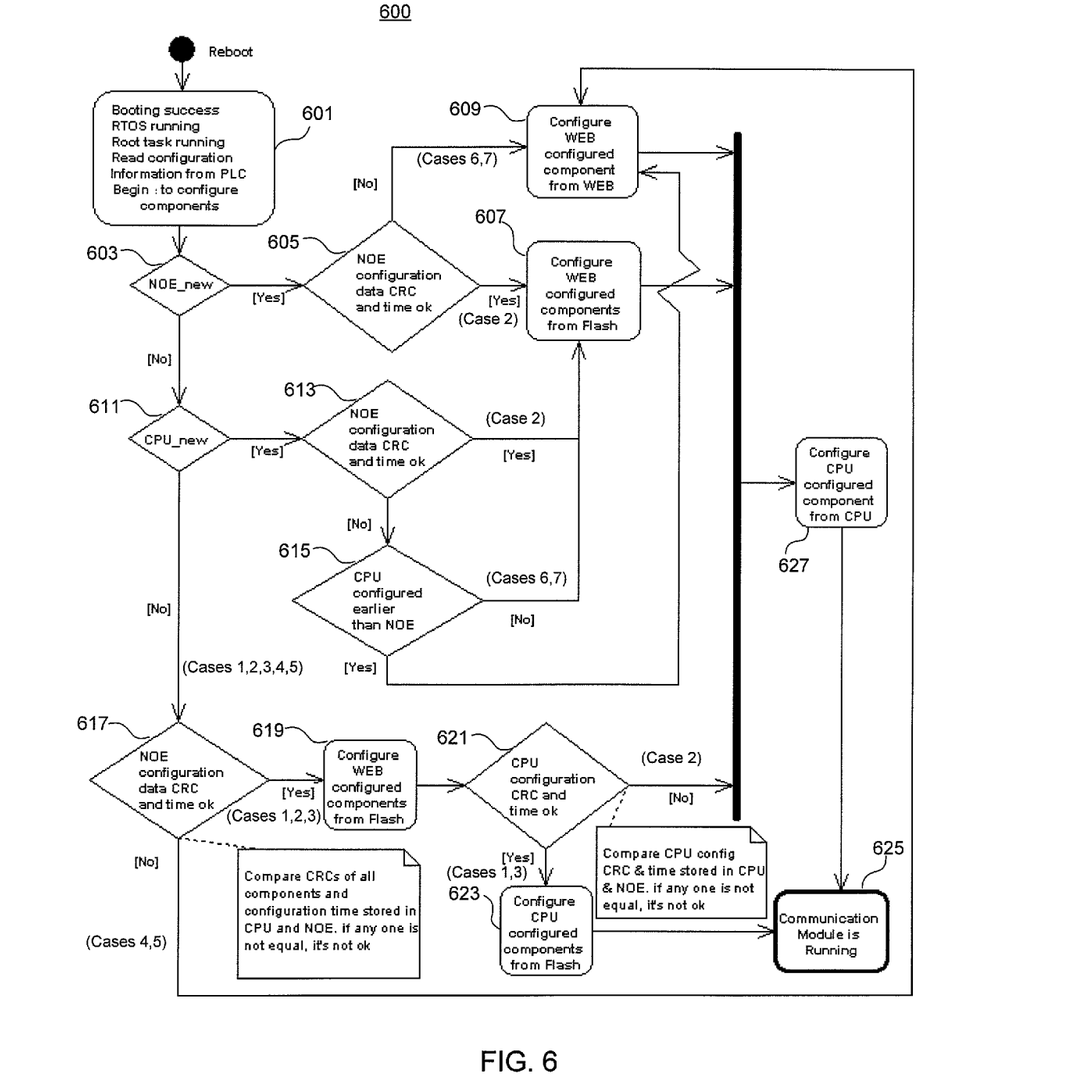
FIG. 6 shows a flow diagram for selecting a configuration source according to an embodiment of the invention.

FIG. 6 shows flow diagram 600 for selecting a configuration source according to an embodiment of the invention. With embodiments of the invention, process 600 is configured by processor 402 as shown in FIG. 4. Flow diagram 600 corresponds to the following pseudo code when configuring components supported by communication module 201. Flow diagram 600 processes the following configuration data:

| | |
|---|---|
| CPU_Config_CRC: | (corresponding to 309a, 309b, 309c) the CRC of the configuration data downloaded from Unity Pro configuration tool 303. |
| CPU_config_time: | (corresponding to 310a, 310b, 310c) the time of the unity download the configuration data to CPU from Unity Pro configuration tool 303. |
| CPU_new: | (corresponding to 312a, 312b) the value corresponding to checkbox "CPU replaced and first time configuration" 307. |
| NOE_new: | (corresponding to 311a, 311b) the value corresponding to checkbox "NOE replaced and first time configuration" 308. |
| NOE_Config_Time: | (corresponding to 315a, 315b, 315c) the time of the NOE change in the configuration. |
| CRC: | (corresponding to 313a, 313b, 313c and 314a, 314b, 314c)CRC for each web configured component |
| Copy_CPU_Config_Data: | (corresponding to 318c) local copy of the configuration data from CPU module 202. |
| Configuration data A: | (corresponding to 316) local copy of the configuration data for component A from WEB. |

In step 601, process 600 begins the configuration process to configure the components of communication module 202. Module 202 is denoted as NOE, although embodiments of the invention can support other types of communication modules. Communication module 202 reads CPU_Config_CRC 309, CPU_config_time 310, CPU_new 312, NOE_new 311, NOE_Config_Time 315, and CRCs for each web configured component (e.g., 313 and 314) typically from system RAM 306. Also, step 601 sets both CPU_new 312 and NOE_new 311 in CPU module 202 to "0" if CPU module 202 does not do this after communication module 202 reads them. This facilitates communication module 202 obtaining the correct configuration information when there is new configuration but when communication module 201 and/or CPU module 202 reboots.

The following listing of the pseudo code denotes corresponding steps in flow diagram 600 and the corresponding configuration scenarios (cases) as shown in FIG. 5.

```
Step 603:
If ( "NOE_new" ) /* There must be a new configuration from Unity Pro configuration
tool */
{
   For each of all the web configured components,
Step 605:
      If (each component CRC in CPU module 202 == each component CRC in NOE
module 201) &&
      if   ( NOE_Config_Time in CPU module   ==   NOE_Config_Time in NOE
module)
         {
         /* This is the case 2 with the checkbox "NOE module replaced and first time
            configuration" in Unity Pro configuration tool is wrongly checked by the
            user. */
Step 607 (Case 2):
            Configure_WEB_Component_from_Flash ( );     /*function definition
below */
         }
         else
         {
            /* Now it is impossible to distinguish case 6 and case 7 here if the user
            check the checkbox "NOE replaced and first time configuration" in Unity
            Pro is wrongly checked by the user. It is exactly the designed role of the
            checkbox "NOE replaced and first time configuration" in Unity Pro to
            distinguish case 6 and case 7.*/
Step 609 (Cases 6 and 7):
            Do not configure components with the data in flash but from WEB;
         }
      /* no matter what other conditions are, the module must read configuration data
         for those components (to be configured from CPU) in new configuration
         situation. */
Step 627:
         Read configuration data from CPU;
         Update Copy_CPU_Config_Data in local flash;
         Configure those components (to be configured from CPU);
}
Step 611:
else If ( " CPU_new " ) /* NOE_new = 0 and new configuration from Unity */
{
      For each of all the web configured components,
```

-continued

```
Step 613:
        If ( each component CRC in CPU == each component CRC in NOE) &&
        if ( NOE_Config_Time in CPU == NOE_Config_Time in NOE)
        {
            /* This is the case 2 with the checkbox "CPU replaced and first time
            configuration" in Unity Pro is wrongly checked by the user. */
Step 607:
                Configure_WEB_Component_from_Flash ( );
        }
Step 615:
        else if ( CPU_Config_Time in CPU <= CPU_Config_Time in NOE))
        {
            /* NOE must be new and the user forgets to check the checkbox "NOE
            replaced and first time configuration" in Unity Pro. Case 7*/
Step 609 (Cases 6 and 7):
                Do not configure components with the data in flash but from WEB;
                /* This avoids NOE module 201 being configured with the inappropriate
configuration data corresponding to a different module or system.*/
        }
        else
        {
            /* Now it is impossible to distinguish case 6 and case 7 here without the
            correct NOE_new. if the user forgets to check the checkbox "NOE
            replaced and first time configuration" in Unity Pro in case 7. It will have
            problem if there is existing configuration data for the web configured
            components. The code here is based on the NOE-new value*/
Step 607 (Cases 6 and 7):
                Configure_WEB_Component_from_Flash( );
        }
        /* no matter what other conditions are, the module must read configuration data
        for those components (to be configured from CPU) in new configuration
        situation. */
Step 627:
        Read configuration data from CPU;
        Update Copy_CPU_Config_Data in local flash;
        Configure those components (to be configured from CPU);
}
else    /* CPU_new = 0 && NOE_new =0 */
{
        /* case 1, case 2, case 3, case 4, and case 5 */
        For each of all the web configured components,
Step 617 (Cases 1, 2, 3, 4, and 5):
        If ( each component CRC in CPU == each component CRC in NOE) &&
        If ("NOE_Config_Time" in CPU == "NOE_Config_Time" in NOE)
        {
            /* This must be the case 1, or case 2, or case 3*/
Steps 621:
                if ( ("CPU_Config_CRC" in CPU == "CPU_Config_CRC" in NOE) &&
                    ("CPU_Config_Time" in CPU == "CPU_Config_Time" in NOE))
                {
Steps 619 and 623 (Cases 1 and 3):
                    /* This must be the case 1 or case 3*/
                    Configure_WEB_Component_from_Flash ( );
                    Configure_CPU_Component_from_Flash ( );    /*function definition
below */
                }
                else
                {
                    /* It is case 2 */
Steps 619 and 627 (Case 2):
                    Configure_WEB_Component_from_Flash( );
                    Read configuration data from CPU;
                    Update Copy_CPU_Config_Data in local flash;
                    Configure those components (to be configured from CPU);
                }
        }
    else /* must be new CPU, or new NOE, or both new */
    {
        If ( ! Exit_Dim_flag)
        {
            /* Exit_Dim_flag is set when Unity Pro reconfigures CPU. Because flag
            is not set, there is no CPU reboot and no new configuration from unity.
            Consequently, it must be NOE replacement, case 4 in Figure 5*/
Steps 609 and 627 (Case 4):
                Read configuration data from CPU;
                Update Copy_CPU_Config_Data in local flash;
                Configure those components (to be configured from CPU);
                Not configure those components (to be configured from WEB) with the
                Data in flash but from WEB;
        }
```

-continued

```
    else
    {
        /* CPU reboot or new configuration from unity */
        /*case 5 */
Steps 609 and 627 (Case 4):
        Read configuration data from CPU;
        Update Copy_CPU_Config_Data in local flash;
        Configure those components (to be configured from CPU);
        Not configure those components (to be configured from WEB) with the
        Data in flash but from WEB;
        Clear Exit_Dim_flag
        }
    }
}
```

When process 600 has completed the configuration, communication module 201 commences operating in the operational mode in step 625.

When process 600 determines configuration data is needed from WEB in order to configure a web-configurable component (corresponding to step 609), process 600 may inform the user to download the data from a web-based configuration source. With some embodiments of the invention, a configuration process may automatically connect to the web-based configuration source and configure the corresponding component.

Figure 7:
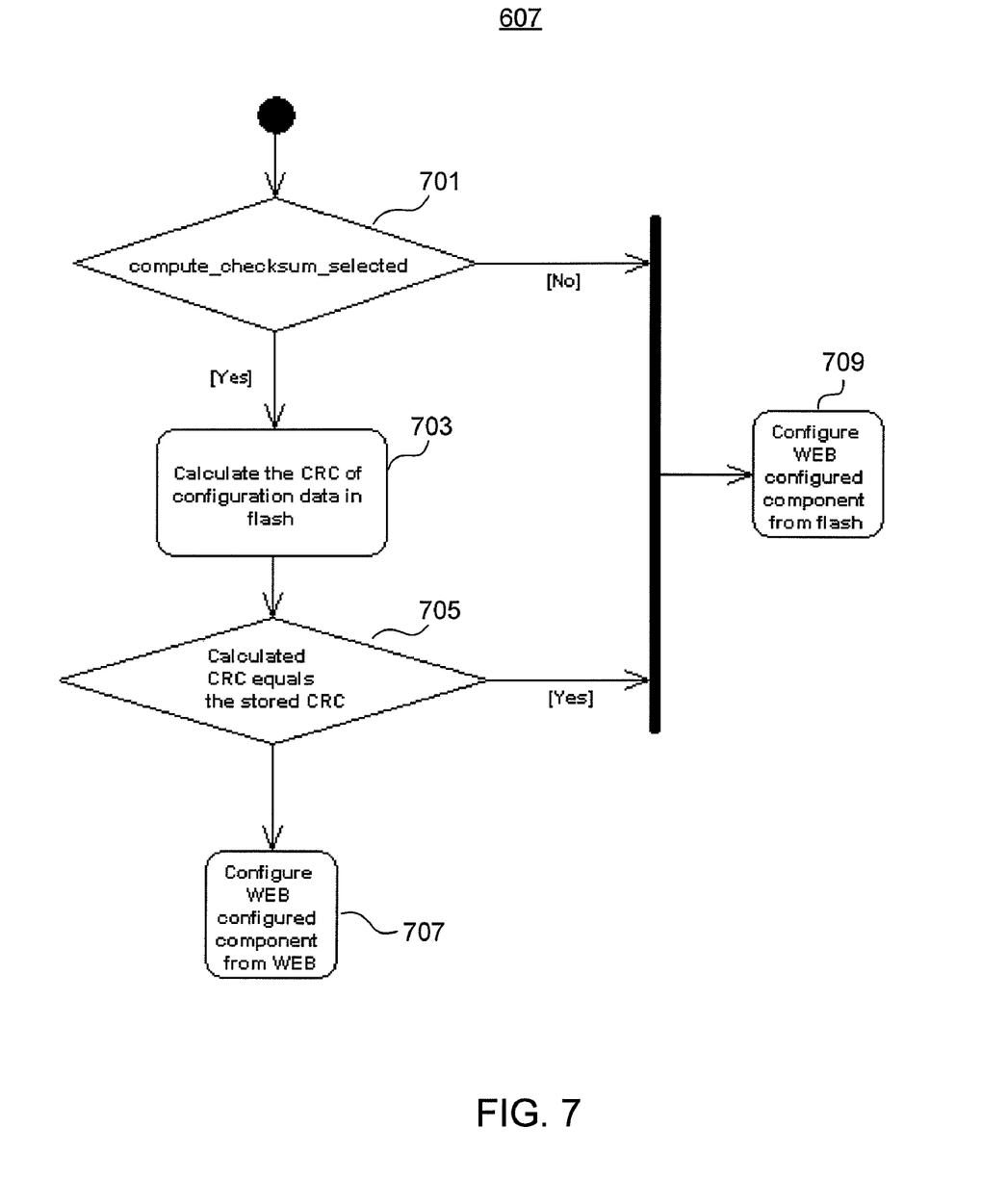
FIG. 7 shows a flow diagram for configuring a web-configured component according to an embodiment of the invention.

FIG. 7 shows flow diagram 607 (corresponding to step 607 as shown in FIG. 6) for configuring a web-configured component according to an embodiment of the invention. As shown with step 701, a user may select not to calculate the checksum of the configuration data of each component (e.g., configuration data 316 and 317 as shown in FIG. 3) and compare the calculated CRC with the stored CRC (e.g., 313c and 314c as stored in flash memory 304). The corresponding steps of flow diagram 607 are shown in the following pseudo code.

```
/* This function configures the web-configured components from the configuration data
in flash */
Configure_WEB_Component_from_Flash ( )
{
Step 701:
    If (compute_checksum_selected)        /* selectable feature for booting time
consideration */
    {
        For each component to be configured from WEB,
Steps 703 and 705
        Compute CRC of its configuration Data in local flash;
        Compare the CRC with its Component_Config_CRC stored in flash;
        If ( equal )
        {
Step 709:
            Configure web-configurable components with its corresponding configuration
data in local flash;
        }
        else /*not equal */
        {
Step 707:
            Do not configure web-configurable component with the data in flash but from
WEB;
            /* avoid using invalid data because of power off during updating flash */
        }
    }
    else /* compute_checksum_selected not selected */
    {
Step 709:
        Configure web-configurable components with its corresponding configuration
data in local flash;
    }
}
```

Figure 8:
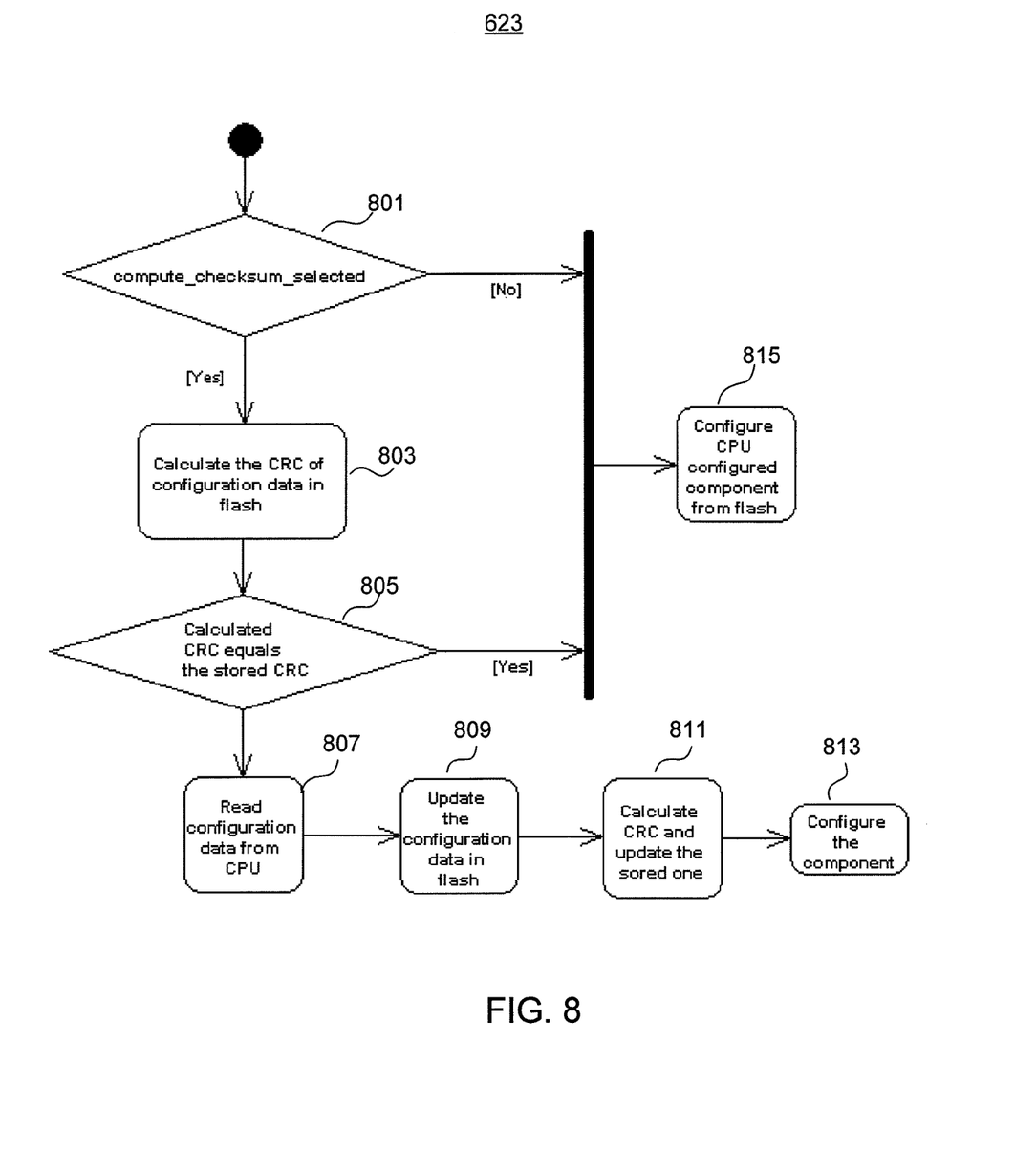
FIG. 8 shows a flow diagram for configuring a CPU-configured component according to an embodiment of the invention.

FIG. 8 shows flow diagram 623 (corresponding to step 623) for configuring a CPU-configured component according to an embodiment of the invention. As shown with step 801, a user may select not to calculate the checksum of the configuration data a CPU-configurable component (e.g., configuration data 318 as shown in FIG. 3) and compare the calculated CRC with the stored CRC (e.g., 309c as stored in flash memory 304). The corresponding steps of flow diagram 623 are shown in the following pseudo code.

```
/* This function configures the CPU-configured components from the configuration data
in flash */
Configure_CPU_Component_from_Flash ( )
{
Step 801:
    If (compute_checksum_selected)        /* selectable feature for booting time
consideration */
    {
Steps 803 and 805:
        Compute CRC of the Copy_CPU_Config_Data in local flash;
        Compare the CRC with CPU_Config_CRC;
        If ( equal )
        {
Step 815:
            Configure those components (to be configured from CPU) with the data of the
            Copy_CPU_Config_Data in local flash;
        }
        else /*not equal */
        {
Step 807:
            Read configuration data from CPU;
Steps 809, 811, and 813:
            Update Copy_CPU_Config_Data in local flash;
            Configure those components (to be configured from CPU);
            /* avoid using invalid data because of power off during updating flash */
        }
    else /* compute_checksum_selected not selected */
    {
Step 815:
        Configure those components (to be configured from CPU) with the data of the
        Copy_CPU_Config_Data in local flash;
    }
}
```

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A circuit module of a programmable logic controller (PLC) comprising:
    an internal memory configured to store stored configuration information;
    a communication interface configured to obtain external configuration information from an external configuration source comprising:
        a network interface configured to communicate through a communication network; and
        a PLC interface configured to communicate with a controller module of the PLC;
    a processor configured to support a first component that is associated with a web-based configuration; and,
    a non-transitory computer-readable medium comprising computer-executable instructions that when executed by the processor, perform a method to determine a configuration scenario and to select a configuration source based on the configuration scenario, wherein the configuration source is either the internal memory or the external configuration source, the method comprising:
    comparing a first redundancy check stored in the circuit module with a second redundancy check stored in the controller module, wherein the first redundancy check and the second redundancy check are associated with the first component; and
    comparing a first circuit module (CM) configuration time stored in the circuit module with a second CM configuration time stored in the controller module.

2. The circuit module of claim 1, wherein the internal memory comprises a flash memory.

3. The circuit module of claim 1, wherein the circuit module comprises a communication module.

4. The circuit module of claim 1, wherein the controller module comprises a central processing unit (CPU) and wherein the processor supports a second component that is associated with a CPU-based configuration.

5. The circuit module of claim 4, wherein the non-transitory computer-readable medium further comprises computer-executable instructions that when executed by the processor cause the processor to perform the method comprising:
    comparing a first redundancy check stored in the circuit module with a second redundancy check stored in the controller module, wherein the first redundancy check and the second redundancy check are associated with the second component; and
    comparing a first CPU configuration time stored in the circuit module with a second CPU configuration time stored in controller module.

6. The circuit module of claim 5, wherein the non-transitory computer-readable medium further comprises computer-executable instructions that when executed by the processor cause the processor to perform the method comprising:
based on the comparing of the redundancy checks and the CPU configuration times, selecting the configuration source either from a CPU-based configuration source or the internal memory.

7. The circuit module of claim 6, wherein the non-transitory computer-readable medium further comprises computer-executable instructions that when executed by the processor cause the processor to perform the method comprising:
selecting the configuration source further based on a new module indicator.

8. The circuit module of claim 1, wherein the non-transitory computer-readable medium further comprises computer-executable instructions that when executed by the processor, cause the processor to perform the method comprising:
based on the comparing of the redundancy checks and the CM configuration times, selecting the configuration source either from a web-based configuration source or the internal memory.

9. The circuit module of claim 8, wherein the non-transitory computer-readable medium further comprises computer-executable instructions that when executed by the processor, cause the processor to perform the method comprising:
selecting the configuration source further based on a new module indicator.

10. The circuit module of claim 1, wherein the communication interface supports a compatible interface selected from a group consisting of universal serial bus (USB), Modbus Plus, Ethernet, and backplane bus.

11. A method for configuring a circuit module, the method comprising:
determining a configuration scenario from a set of possible configuration scenarios, the set including a first configuration scenario and a second configuration scenario, the determination comprises:
comparing a first redundancy check stored in the circuit module with a second redundancy check stored in an associated controller module, wherein the first redundancy check and the second redundancy check are associated with a first component of the circuit module; and
comparing a first circuit module (CM) configuration time with a second CM configuration time stored in the associated controller module;
when the determined configuration scenario is the first configuration scenario, selecting an internal configuration source;
when the determined configuration scenario is the second configuration scenario, selecting an external web-based configuration source; and
configuring the first component of the circuit module using configuration data from the selected configuration source.

12. The method of claim 11, wherein the internal configuration source comprises a flash memory.

13. The method of claim 11, wherein the first component is associated with a CPU-based configuration.

14. The method of claim 13, further comprising:
comparing a first CPU configuration time stored in the circuit module and a second CPU configuration time stored in the associated controller module.

15. The method of claim 14, further comprising:
based on the comparing of the redundancy checks and the CPU configuration times, determining the selected configuration source either from a CPU-based configuration source or the internal configuration source.

16. A non-transitory computer-readable storage medium storing computer-executable instructions that, when executed, cause a processor to perform a method comprising:
determining a configuration scenario from a set of possible configuration scenarios, the set including a first configuration scenario and a second configuration scenario, the determination comprises:
comparing a first redundancy check stored in the circuit module with a second redundancy check stored in an associated controller module, wherein the first redundancy check and the second redundancy check are associated with a first component of the circuit module; and
comparing a first circuit module (CM) configuration time with a second CM configuration time stored in the associated controller module;
when the determined configuration scenario is the first configuration scenario, selecting an internal configuration source;
when the determined configuration scenario is the second configuration scenario, selecting an external web-based configuration source; and
configuring the circuit module using configuration data from the selected configuration source.

17. The computer-readable storage medium of claim 16, the method further comprising:
based on the comparing of the redundancy checks and the CM configuration times, determining the selected configuration source either from a web-based configuration source or the internal configuration source.

18. The computer-readable storage medium of claim 16, wherein the component is associated with a CPU-based configuration and the method further comprising:
comparing a first CPU configuration time stored in the circuit module and a second CPU configuration time stored in the associated controller module.

19. The computer-readable storage medium of claim 18, the method further comprising:
based on the comparing of the redundancy checks and the CPU configuration times, determining the selected configuration source either from a CPU-based configuration source or the internal configuration source.

* * * * *